Oct. 17, 1944.　　　J. P. O'HALLORAN　　　2,360,513
PIPE CONSTRUCTION
Filed March 17, 1943
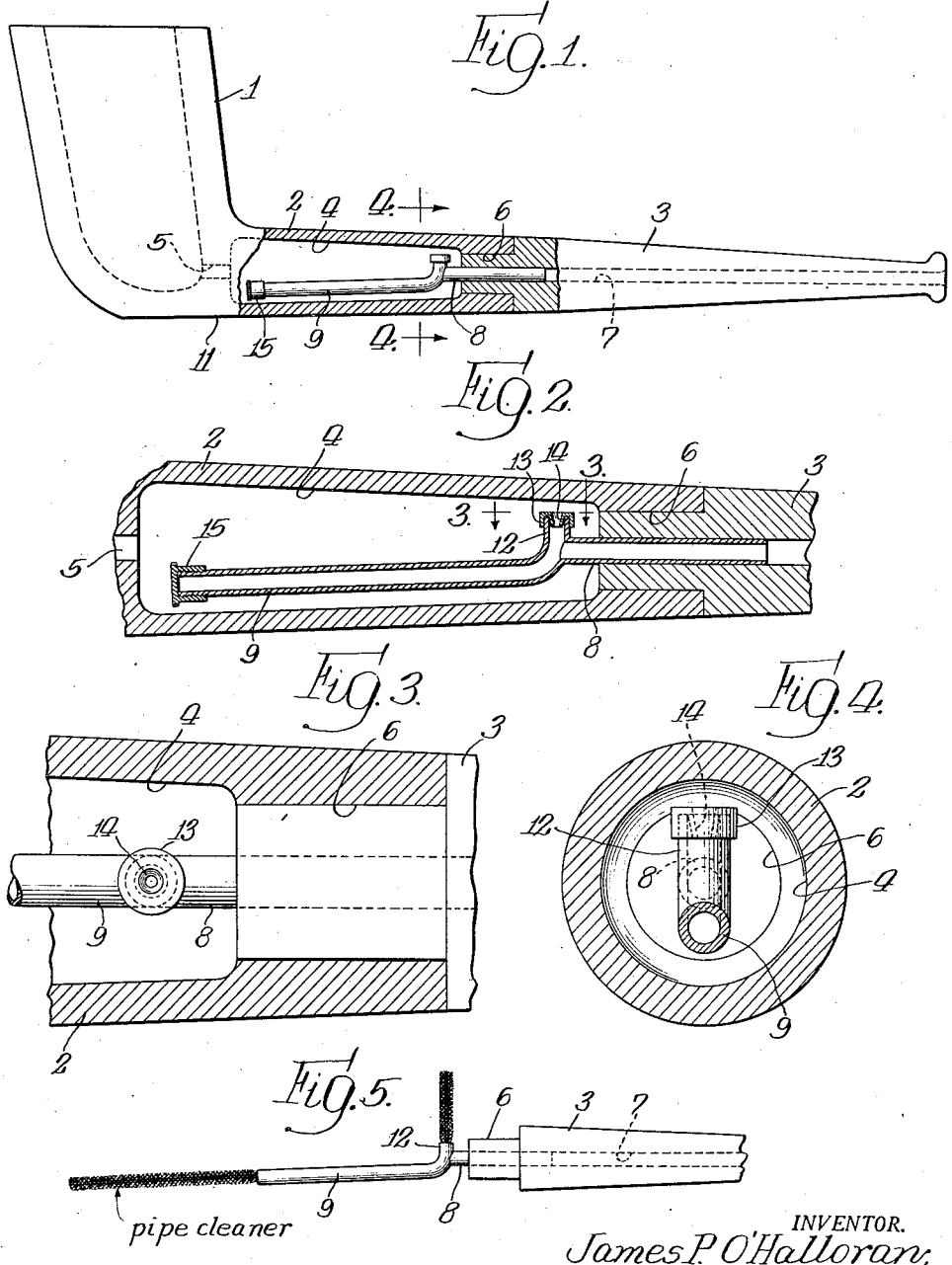

Patented Oct. 17, 1944

2,360,513

UNITED STATES PATENT OFFICE 2,360,513

PIPE CONSTRUCTION

James P. O'Halloran, Chicago, Ill.

Application March 17, 1943, Serial No. 479,473

4 Claims. (Cl. 131—211)

This invention relates to smoking pipes and particularly to improvements in means for trapping moisture in such pipes.

In the ordinary use of pipes two types of moisture occur, one being the condensation of oils and various vapors from the tobacco itself while the other is saliva which may enter the pipe stem.

This invention aims to keep these two types of moisture separated and to prevent them from interfering with the flavor of the smoke.

One of the objects of the invention is to provide a smoke chamber in which condensation of condensible substances of the smoke may take place, while saliva is prevented from entering this chamber.

Another object of this invention is to provide a moisture trap which will not interfere with the ordinary smoking of the pipe and will positively trap all saliva, under ordinary conditions.

Another object of this invention is to construct a moisture trap and smoke condensation chamber in such a manner that they may be quickly and conveniently cleaned.

Still another object of the invention is to provide the foregoing advantages in a pipe construction which makes it possible to remove the moisture trap integrally with the pipe stem when separating the latter from the pipe shank to facilitate the cleaning of the pipe.

Other objects and advantages of the invention, which are inherently possessed by it will become apparent from a perusal of the specification and drawing.

Referring now to the drawing,

Fig. 1 is a side elevation with a portion in section, of a pipe constructed in accordance with this invention.

Fig. 2 is an enlarged sectional view of that portion of the pipe which is shown in partial section in Fig. 1.

Fig. 3 is a detail view taken approximately on the line 3—3 of Fig. 2, showing a top view of a portion of the moisture trap.

Fig. 4 is a vertical sectional view on the line 4—4 of Fig. 1.

Fig. 5 is a detail view showing the pipe stem withdrawn together with the moisture trap, and with a pipe cleaner inserted through part of the trap for cleaning.

Referring further to the drawing, in Fig. 1 is shown a pipe constructed in accordance with this invention having a bowl 1, a shank 2, and the stem 3.

The shank is provided with an enlarged chamber 4 which communicates with the bowl by means of a small passage 5. At the opposite end of the shank a portion thereof is shaped to form a seat for the tenon 6 of the pipe stem 3. Ordinarily the fit of these two cooperating parts will be snug as is common practice in the construction of pipes. Seated in the smoke passage 7 of the pipe stem is a moisture trap element preferably consisting of two tubes welded, molded, or otherwise formed into a unitary structure of the character shown in the drawing. The rear tubular member 8 is shaped to fit snugly into the stem and to extend a substantial distance thereinto to form a secure support for the device.

The forward tubular member 9 is offset from the rear substantially in the manner shown so that moisture accumulating or condensing in the forward tubular member will not tend to run rearwardly and enter the mouthpiece, that is, at the angle of inclination at which a pipe is ordinarily held in the smoker's mouth or when resting on a table in an upright position, for example, as when resting on the flat area 11, such as is commonly provided on the under side of pipe shanks.

The saliva trap consisting of the tubular members 8 and 9, joined as shown, preferably will be made of some lightweight thin material suitable for that type of structure, such as aluminum or a light metal alloy, or some plastic composition. The rear end of the tubular member 9 is curved upwardly and terminates at a level above the member 8, as shown, and at the top of that extension 12 is provided with a cap 13 made of any lightweight and suitable material. This cap, which has a slip fit over the end of extension 12, has a central hole 14 which permits the smoker to draw smoke from the bowl, through the hole 14, through the extension 12, thence into the member 8 and into the pipe stem.

At the forward end of the tubular member 9 is a cap 15, preferably threaded thereon, but not provided with any hole. However like the cap 13 it is easily removable when it is desired to clean the moisture trap.

In the operation of the device the two caps are in place as shown and the smoke is drawn from the bowl through aperture 14 into the pipe stem. In the enlarged chamber 4 in the pipe shank condensation of some oils, tarry substances and water vapor coming from the tobacco may occur and such condensation will be collected in this space and allowed to remain there, subject to being cleaned out at intervals. In no event can such condensation in the chamber 4 enter through the aperture 14 into the pipe stem.

On the other hand, moisture in the form of saliva which might travel down the pipe stem can enter the tubular member 8 but will be diverted into the member 9 which is offset at a lower level and should remain there until removed by a pipe cleaning operation. Also vapor which may travel down the pipe stem into the tubular members 8 or 9 may condense therein and should likewise flow into the offset member 9 and remain there.

The capacity of the member 9 is calculated to be large enough to retain all condensed moisture and saliva which can ordinarily accumulate between pipe cleaning operations, but while it is so collected the smoke passing into the pipe stem is not required to pass through the collected moisture nor even over it, to be contaminated thereby.

The cleaning of the pipe will be found to be extremely simple. The stem can be withdrawn from the shank in the usual manner. Thereafter the two caps 13 and 15 will be removed and an ordinary pipe cleaner will be inserted through the tubular member 9 as shown in Fig. 5. The cleaner may also be inserted through the pipe stem in the usual manner to enter into the member 8 and clean it. The chamber 4 in the pipe shank, being somewhat larger, may be cleaned by a doubled pipe cleaner or by paper or any other suitable cleaning device. Thus is will be seen that all portions of this pipe including the smoke chamber 4 and the fabricated members 8 and 9 can readily be cleaned and kept sweet without any special equipment other than any ordinary pipe cleaning equipment. Also while the device does trap and retain moisture, moisture such as saliva received from the pipe stem is positively protected from entering the pipe bowl.

While the drawing shows the tenon 6 and the chamber 4 to have quite different diameters the pipe may be so constructed as to have a somewhat larger tenon and a smoke chamber 4 of the same diameter, to allow for boring the shank all at one diameter. In such a construction there would be allowed room enough for the forward leg of the moisture trap to lie off-center and at a lower level than the axis of the pipe stem so that moisture might drain by gravity from the pipe stem into the duct 9 and remain there.

The restricted aperture in the cap 13 facilitates the retention of liquid in the moisture trap in the event that the pipe is inverted as when knocking ashes out of it. However, this same result may be attained in some other manner, if desired.

It should be understood that the drawing and specification show and describe a preferred embodiment of the invention which has been selected to show its nature and manner of use, but that the invention is capable of some variation and modification without departing from the scope of the invention, particularly as defined in the claims.

Having shown and described my invention, I claim:

1. A pipe comprising a bowl, a stem, a shank having an elongated smoke chamber of diameter greater than the tenon of the stem, and a moisture trap comprising a tubular structure supported in the smoke passage of the stem extending into the smoke chamber and having an offset branch extending above the level of said smoke passage for admitting smoke from the upper part of said chamber, said tubular structure having another branch extending at a steep angle downwardly from the axial line of the smoke passage and thereafter extending forwardly and gently inclined downwardly within the smoke chamber whereby when the smoke passage is level moisture in said branch will flow by gravity forwardly and downwardly, the forward end of said second branch being normally sealed from said chamber but openable for cleaning purposes.

2. A pipe comprising a bowl, a stem, and a shank having a bore for receiving the tenon of the stem, said shank being provided with an enlarged smoke chamber of diameter greater than said bore, the bottom surface of said chamber being inclined downwardly and forwardly relatively to the axial line of the smoke passage of the stem, and a tubular structure constituting a moisture trap having a portion supported in the smoke passage of the stem, having an upwardly rising branch apertured to receive smoke from the upper portion of the chamber and communicating with said smoke passage, and having another branch steeply inclined downwardly from the level of the smoke passage and thereafter gently inclined forwardly and downwardly close to the downwardly sloping bottom wall of said smoke chamber, below the level of the bottom of said bore whereby moisture in said forward branch must flow forwardly and downwardly when the smoke passage is level, the forward most end of said end of said forwardly sloping branch being normally sealed from the smoke chamber but openable for cleaning.

3. A pipe comprising a bowl, a stem, and a shank having a bore for receiving the tenon of the stem and having a smoke chamber of diameter greater than said bore, and a tubular moisture trap including a tubular portion supported in the smoke passage of the stem and another tubular portion extending upwardly just forwardly of the end of the tenon apertured to receive smoke from the smoke chamber and to admit it into the smoke passage, and a third tubular portion having a passage communicating smoothly with said upwardly extending portion whereby a pipe cleaner may be passed continuously through both of them, said third portion being steeply inclined downwardly below said upwardly rising portion and thereafter being inclined gently and forwardly toward the forward end of the smoke chamber and extending eventually to a level below the bottom level of said bore, the forward end of said third portion being normally sealed from the smoke chamber but openable to admit a pipe cleaner, the tubular trap being arranged to be withdrawn from the chamber integrally with the pipe stem by first withdrawing the tenon from the bore by a straight axial movement and thereafter rocking it from the said axial position to clear the forward most end of the moisture trap.

4. A pipe comprising a bowl, a stem, a shank having a bore for receiving the tenon of the stem and having an enlarged smoke chamber of diameter greater than said bore extending forwardly therefrom, and a tubular moisture trap comprising a tubular portion seated in the smoke passage of said stem, a second tubular portion communicating with the first and rising at a steep angle therefrom immediately forward of the end of the tenon, and a third tubular portion extending steeply downwardly below said second portion and subsequently gently inclined downwardly and extending forwardly in said smoke chamber to cause a gravity flow of moisture therein when the smoke passage is level, the forwardmost end of the third portion being normally sealed from the chamber but openable to receive a pipe cleaner and extending to a level below the level of the bottom of said bore, the second and third tubular portions being arranged for convenient cleaning by the passage of an ordinary pipe cleaner therethrough, while the first tubular portion is cleanable by inserting a pipe cleaner through the smoke passage in the pipe stem.

JAMES P. O'HALLORAN.